United States Patent
Hall et al.

(10) Patent No.: US 9,649,560 B2
(45) Date of Patent: *May 16, 2017

(54) RF COLLABORATION METHOD TO REDUCE RF INTERFERENCE WITH WIRELESS ADAPTER

(71) Applicant: MICROSOFT TECHNOLOGY LICENSING, LLC, Redmond, WA (US)

(72) Inventors: Paul W. Hall, Woodinville, WA (US); David W. Russo, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,021

(22) Filed: Jun. 25, 2015

(65) Prior Publication Data
US 2015/0296510 A1 Oct. 15, 2015

Related U.S. Application Data

(63) Continuation of application No. 11/022,141, filed on Dec. 23, 2004, now Pat. No. 9,079,103.

(51) Int. Cl.
| | |
|---|---|
| H04B 1/00 | (2006.01) |
| A63F 13/327 | (2014.01) |
| A63F 13/90 | (2014.01) |
| A63F 13/23 | (2014.01) |
| H04B 1/713 | (2011.01) |
| H04W 72/04 | (2009.01) |
| H04W 72/08 | (2009.01) |
| H04W 84/12 | (2009.01) |

(52) U.S. Cl.
CPC ............ *A63F 13/327* (2014.09); *A63F 13/08* (2013.01); *A63F 13/23* (2014.09); *H04B 1/713* (2013.01); *H04W 72/0446* (2013.01); *H04W 72/082* (2013.01); *A63F 2300/405* (2013.01); *H04W 84/12* (2013.01)

(58) Field of Classification Search
CPC ........ A63F 13/08; A63F 13/23; A63F 13/327; A63F 2300/405
USPC ....................................................... 455/63.1
See application file for complete search history.

(56) References Cited

U.S. PATENT DOCUMENTS

| | | | | |
|---|---|---|---|---|
| 7,046,649 B2 * | 5/2006 | Awater et al. | ................ | 370/338 |
| 2004/0242159 A1 * | 12/2004 | Calderon et al. | ............ | 455/63.3 |
| 2005/0181823 A1 * | 8/2005 | Haartsen | .................... | 455/553.1 |

* cited by examiner

*Primary Examiner* — Ajibola Akinyemi
(74) *Attorney, Agent, or Firm* — Baker & Hostetler LLP

(57) ABSTRACT

A system and method for preventing a wireless controller system and WiFi radio system within a game console from interfering with each other. Specifically, the WiFi system is adapted to avoid activating its transmitter during the controller receive times by detecting a signal sent to the WiFi module indicating where the controller receive times occur without an explicit signal indicative of the controller receive times.

11 Claims, 3 Drawing Sheets

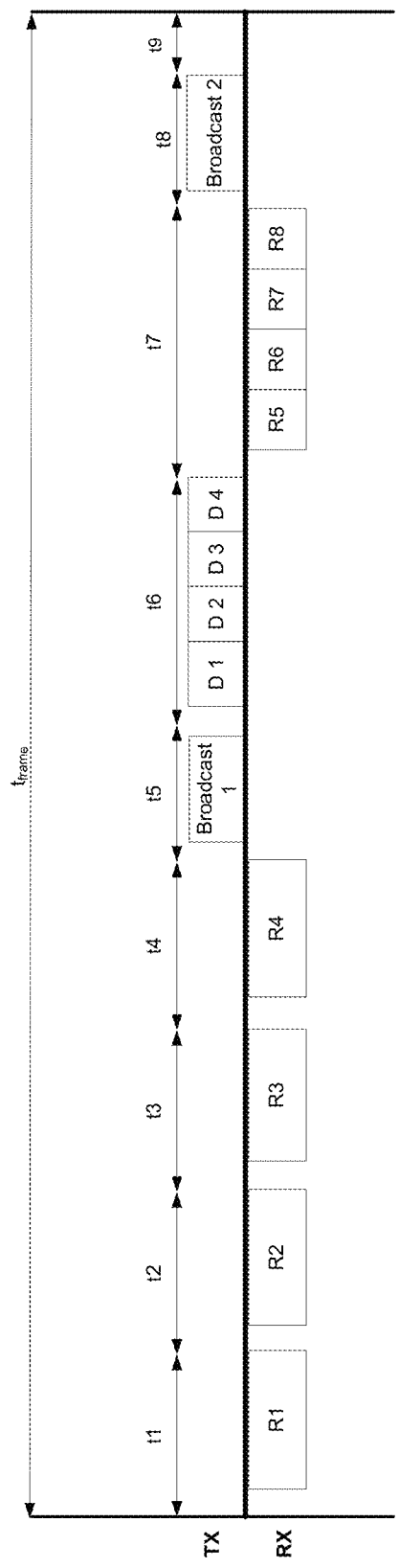

RF COLLABORATION METHOD TO REDUCE RF INTERFERENCE WITH WIRELESS ADAPTER

CROSS-REFERENCE TO RELATED APPLICATIONS

This application claims priority to and is a continuation of U.S. patent application Ser. No. 11/022,141 filed Dec. 23, 2004, now issued as U.S. Pat. No. 9,079,103, the content of which is hereby incorporated by reference in its entirety.

FIELD OF THE INVENTION

This invention generally relates to the field of gaming and multimedia devices. In particular, the present invention is directed to a method of reducing RF interference between a wireless network radio and a wireless adapter in the device.

BACKGROUND OF THE INVENTION

In gaming systems or other devices having two different wireless radio subsystems there is a possibility that interference may exist between the two or more sub-systems. This is a problem, for example, if each radio system operates autonomously and uses the 2.4 GHz (or other) band to operate. To prevent this from occurring, some type of spectrum sharing between these two radio sub-systems is required. Simple avoidance by using different parts of the spectrum is not sufficient because power levels of the first transmitter may affect the second receiver regardless of the specific portion of the spectrum it is operating. The problem is worse, if RF channels within the band overlap. As such, conventional solutions have been costly or have failed to acceptably reduce the interference problem.

Thus, there is a need for a system and method for reducing the interference between two radio subsystems operating in the same band. There is also a need for the system to be cost efficient and effective. The present invention provides such a solution.

SUMMARY OF THE INVENTION

The present invention is directed to a gaming console that includes a memory, a microprocessor, an RF energy detection module, a first radio subsystem that communicates to a network infrastructure, and a second radio subsystem that communicates to a wireless accessory. When the second radio subsystem communicates to the wireless accessory, the RF energy detection module receives transmissions from the second radio subsystem and generates a signal that is input to a local timing signal generated in order to delay an output of the first radio subsystem such that the transmissions from the first radio subsystem do not interfere with the second radio subsystem.

In accordance with a feature of the invention, a comparator may compare the transmissions from the second radio subsystem to the local timing signal to adjust the local timing signal. Frame timing of a signal communicated by the second radio subsystem may be locally recreated by the local timing signal and the first radio subsystem delays transmissions in accordance with the frame timing.

In accordance with another feature of the invention, the first radio subsystem and the second radio subsystem transmit in a same frequency band and the first radio subsystem may be a WiFi radio and the second radio subsystem may be an Adaptive Frequency Hopping (AFH) radio.

In accordance with another aspect of the invention, there is provided a method of collaboration between a first radio subsystem and a second radio subsystem in a gaming console. The method includes generating a local timing signal provided to the first radio subsystem; detecting transmissions of the second radio subsystem; adjusting the local timing signal in accordance with the detected transmissions; and delaying an output of the first radio subsystem such that the transmissions from the first radio subsystem do not interfere with the second radio subsystem.

In accordance with another aspect of the invention, there is provided a method of collaboration between a WiFi radio and an Adaptive Frequency Hopping (AFH) radio that share frequency spectrum. The method includes generating a local timing signal that is provided to the WiFi radio; detecting transmissions of the AFH radio; adjusting the local timing signal in accordance with the detected transmissions; and delaying an output of the WiFi radio such that the transmissions from the WiFi radio do not interfere with the AFH radio.

In accordance with a feature of the invention, the WiFi radio may delay transmissions in accordance with the frame timing of the AFH radio signal. Alternatively, the output of the WiFi radio may be delayed during the receive timeslots of the AFH radio.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 illustrates an exemplary frame of a protocol used by the second radio system.

DETAILED DESCRIPTION OF ILLUSTRATIVE EMBODIMENTS

Figure 1:
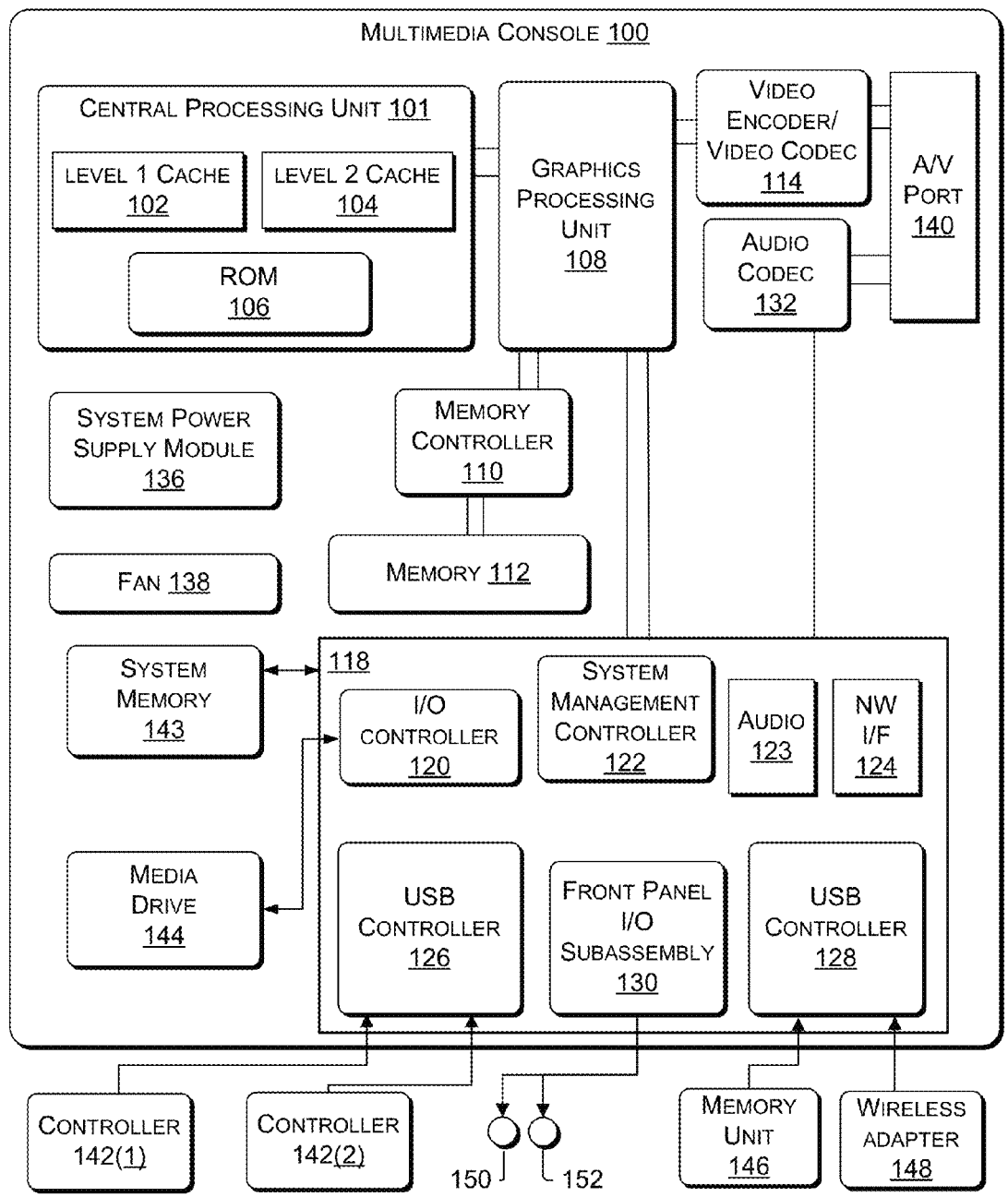
FIG. 1 is a block diagram showing a gaming console in which aspects of the present invention may be implemented.

FIG. 1 illustrates the functional components of a multimedia console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitates processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 provides access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 2:
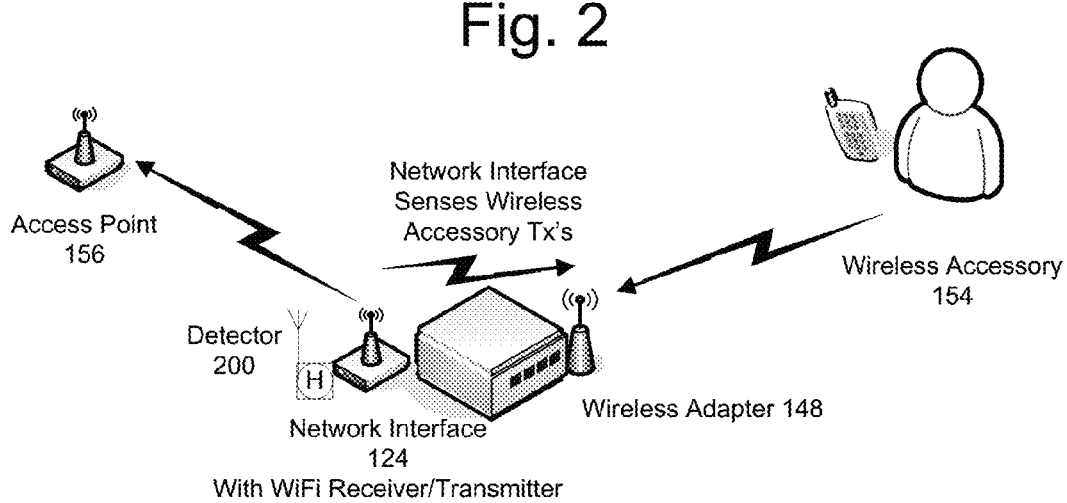
FIG. 2 illustrates the console of FIG. 1 having two different radio sub-systems.

Referring to FIG. 2, the console 100 may be configured having two different radio sub-systems. The first wireless system (network interface 124) is an 802.11b/g standard compliant module (e.g., WiFi Radio having a transmitter and receiver) which is used for wireless home network connectivity via an access point 156. This can be used in place of a standard Ethernet connection to add wireless networking ability to access the Internet or remote PC's. The second wireless system (wireless adapter 148) is a frequency-hopping, low transmit power system for wireless connectivity of various peripherals (e.g., a wireless accessory 154) which can be used to operate the games. A detector 200 is provided to sense transmissions by the wireless adapter 148 and to locally recreate a timing signal. The timing signal is used to prevent the WiFi radio in the network adapter 124 from transmitting during critical receive times of the wireless adapter 148. The design and operation of the detector 200 will be described in greater detail below with reference to FIGS. 3 and 4.

Here, both wireless radio sub-systems operate in the Industrial-Scientific-Medical (ISM) 2.4 GHz band and each radio has the potential to create RF interference into the other's operation. Because of this, the present invention advantageously provides a coordination activity between them which allow these radios to share the same spectrum in order to reduce RF interference between the two radio sub-systems. The interference problem is most problematic when: (1) the WiFi radio transmitter in the network interface 124 is transmitting and the wireless adapter 148 is receiving, regardless of RF channel used in the ISM band, and (2) the transmitter in the wireless adapter 148 is transmitting on an overlapping RF channel with the WiFi radio in the network interface 124.

The reason the first case is a problem is because of a combination of two factors: the absolute transmit power of the WiFi transmitter (up to +20 dBm), and the out-of-band rejection capability of the wireless adapter 148. When these two items are combined, there is a significant amount of de-sensitivity occurring within the wireless adapter 148. The receiver sensitivity drops because of this interference. This has a significant effect on the overall distance that the wireless accessory 154 can be located away from the console 100. In other words, it will diminish the region of RF coverage. It will also impact the battery life of the wireless accessory 154 because of the need for extra transmit power levels necessary to maintain the RF signal quality.

In the second case, when the wireless adapter radio 148 is transmitting on an RF channel that overlaps those being used by the WiFi radio in the network interface 124, it will de-sensitize the WiFi radio receiver if it is in a receive mode. Further, if the WiFi radio transmitter is transmitting, the wireless adapter 148 receiver signal strength will be too small relative to the WiFi radio transmitter and the wireless adapter communications channel (i.e., link 148 ->154) will not operate.

To resolve the above-noted problems, the present invention prevents the WiFi radio transmitter in the network interface 124 from transmitting during the critical transmit and receive times of the wireless adapter 148. This is because if the WiFi radio transmitter in the network interface 124 transmits during these times, the wireless accessory radio link (i.e., link 148 ->154) will not function in either the transmit or receive state. Since the WiFi radio transmitter in the network interface 124 will be suspended during reasonability significant portions of time, there will be potential impacts to the amount of throughput which can be achieved by the network interface 124. If the WiFi radio in the network interface 124 is attempting to stream data in the uplink direction (i.e., the WiFi radio transmitter is very active), the throughput would drop significantly. Because the two radio networks (i.e., network interface 124 and wireless adapter 148) are sharing the same spectrum and each has the ability to impact the performance of the other, the present invention has given priority to the wireless accessory radio link (148 ->154).

FIG. 3 illustrates one frame time of an exemplary wireless accessory protocol for use in the link 148 ->154. The protocol has a TDMA frame structure in which there are defined timeslots that indicate transmission (TX) and reception (RX) activities from the wireless accessory radio within the console 100. Transmit times (TX) are shown above the line and receive time slots (RX) are shown below the line. This structure repeats over time.

Figure 4:
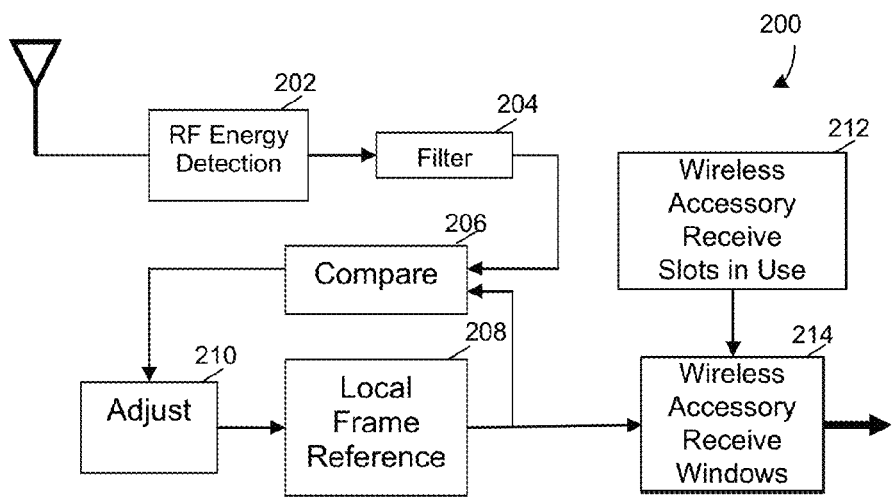
FIG. 4 illustrates a device to detect RF transmissions and to generate a local timing signal.

Referring now to FIG. 4, there is illustrated the detector 200 in greater detail. The detector 200 receives the transmission events of the wireless adapter 148. By this, the detector 200 and/or the network interface 124 can derive the overall frame timing autonomously. As shown in FIG. 3, the Broadcast 1 burst occurs once every $t_{frames}$ seconds, as does the Broadcast 2 burst. The transmission of the D1-D4 bursts depends upon the actual configuration of the console 100. By sensing when these wireless adapter transmissions occur, it is possible to locally re-generate the timing signal associated with these Broadcast bursts in the detector 200 without an explicated physical connection. After the frame timing signal has been generated by the detector 200 and/or network interface 124, the receive window time of the wireless adapter 148 receiver can be re-created since there is a fixed timing relationship between the transmit timeslot and the receive slots. Once the receive window times are known, the WiFi radio transmitter in the network interface 124 can use this information to avoid activating its transmitter during those periods.

The detector 200 that performs the above-mention function of locally recreating the timing signal. The detector 200 includes an RF energy detection component 202 that receives RF transmissions. The detected emissions are filtered by a filter 204 to prevent external interference noise from corrupting a local reference signal 208. There are many known methods to implement such filtering. The local reference signal 208 is a timing signal that is generated in synchronism with the wireless adapter radio transmission bursts (i.e., every $t_{frames}$ seconds). The detected and filtered RF energy from the wireless adapter radio is compared (in time) by a comparator 206 against the reference signal 208 and an error is calculated. This error signal 210 is then used to adjust the reference timing signal 208 to match the actual wireless adapter radio transmission times.

Since the time base of the local frame reference is different from that used to generate the wireless adapter radio frame timing, it is necessary for the local reference signal to track to the wireless adapter radio frame timing. In addition, the wireless adapter radio timing will slowly drift over time. The local reference signal 208 tracks these changes to remain synchronized. By using knowledge of which wireless adapter radio receive slots 212 are actually being used, the receive window timing information 214 can be created. The resulting signal can be input into the WiFi transmission algorithm to determine the appropriate times to turn on the WiFi transmitter.

While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. An apparatus, comprising:
a memory;
a microprocessor;
a first radio subsystem that transmits data to and receives data from a network infrastructure; and
a second radio subsystem that transmits data to and receives data from a wireless accessory during defined time slots that repeat over time, the first and second radio subsystems operating independently of each other; and
a radio frequency (RF) energy detection module that detects wireless transmissions of said second radio subsystem and autonomously generates, based on the detected wireless transmissions of said second radio subsystem, a frame timing signal that reflects the time slots in which data is transmitted and received by the second radio subsystem,
the frame timing signal generated by the RF energy detection module being used to control the timing of transmissions by said first radio subsystem to reduce interference between the first and second radio subsystems.

2. The apparatus of claim 1, further comprising a comparator that compares the transmissions from said second radio subsystem to said autonomously generated frame timing signal to adjust said autonomously generated frame timing signal.

3. The apparatus of claim 1, wherein said first radio subsystem delays transmissions in accordance with said autonomously generated frame timing signal.

4. The apparatus of claim 1, wherein said first radio subsystem and said second radio subsystem transmit in a same frequency band.

5. The console of claim 4, wherein said first radio subsystem comprises a WiFi radio and said second radio subsystem comprises an Adaptive Frequency Hopping (AFH) radio.

6. A method of collaboration between a first radio subsystem and a second radio subsystem in an apparatus, comprising:
generating a local timing signal provided to said first radio subsystem;
detecting transmissions of said second radio subsystem, the first and second radio subsystem operating independently of each other adjusting said local frame timing signal based on said detected wireless transmissions so that said local frame timing signal reflects defined time slots in which said second radio subsystem wirelessly transmits and receives information; and
controlling wireless output of said first radio subsystem in accordance with said local frame timing signal so that the wireless transmissions from the first radio subsystem do not interfere with the wireless transmissions of said second radio subsystem.

7. The method of claim 6, wherein said first radio subsystem delays transmissions in accordance with said local frame timing signal.

8. The method of claim 6, wherein said first radio subsystem and said second radio subsystem transmit in a same frequency band.

9. The method of claim 8, wherein said second radio subsystem comprises an AFH radio, and wherein said generating step further comprises determining transmit and receive timeslots of said AFH radio from said detected transmissions.

10. The method of claim 9, said delaying the output of said WiFi radio occurring during said transmit and receive timeslots of said AFH radio as reflected by the generated local frame timing signal.

11. A method of collaboration between a WiFi radio and an Adaptive Frequency Hopping (AFH) radio both of which are disposed within an apparatus and both of which share frequency spectrum, the WiFi radio wirelessly transmitting information to and wirelessly receiving information from a wireless infrastructure, the AFH radio wirelessly transmitting information to and wirelessly receiving information from a wireless accessory of the apparatus, the method, comprising:
detecting, by a radio frequency (RF) detection module, wireless transmissions of said AFH radio to the wireless accessory device, the AFH radio and the WiFi radio operating independently of each other;
autonomously generating in response to the detected wireless transmissions, a local frame timing signal that reflects defined time slots in which the AFH radio wirelessly transmits and receives information;
adjusting said local frame timing signal based on said detected wireless transmissions to ensure that the local frame timing signal tracks the frame timing of the AFH radio; and
controlling said WiFi radio using the local frame timing signal so that wireless transmissions from said WiFi radio do not interfere with the wireless transmissions of said AFH radio, wherein controlling said WiFi radio comprises delaying wireless transmissions from said WiFi radio based on the local frame timing signal so that the WiFi radio transmissions do not occur during the transmit and receive time slots of the AFH radio reflected by the local frame timing signal.

* * * * *